(12) United States Patent
Scheinberger et al.

(10) Patent No.: US 8,033,003 B2
(45) Date of Patent: Oct. 11, 2011

(54) FASTENING ASSEMBLY AND DISPOSABLE SLEEVE FOR SAME

(75) Inventors: Marcus Scheinberger, Hofheim (DE); Reynald Rousselle, Antony (FR)

(73) Assignee: Fairchild Fasteners Europe, Kelkheim (DE)

( * ) Notice: Subject to any disclaimer, the term of this patent is extended or adjusted under 35 U.S.C. 154(b) by 802 days.

(21) Appl. No.: 11/838,743

(22) Filed: Aug. 14, 2007

(65) Prior Publication Data

US 2008/0044252 A1 Feb. 21, 2008

(30) Foreign Application Priority Data

Aug. 18, 2006 (DE) ..................... 20 2006 012 668 U (51) Int. Cl.
*B23P 11/02* (2006.01)

(52) U.S. Cl. ............. 29/446; 29/512; 29/523; 29/524.1; 29/283.5; 269/3; 269/6; 411/34

(58) Field of Classification Search .................... 29/512, 29/523, 524.1, 243.53, 243.517, 283.5, 446; 411/34; 269/3, 6
See application file for complete search history.

(56) References Cited

U.S. PATENT DOCUMENTS

| | | | | |
|---|---|---|---|---|
| 2,971,425 A * | 2/1961 | Blakeley | ........................... | 411/28 |
| 3,465,637 A | 9/1969 | Cushman et al. | | |
| 4,411,458 A * | 10/1983 | Strunk et al. | .................. | 285/196 |
| 4,548,533 A * | 10/1985 | Pratt | ............................... | 411/55 |
| 4,936,726 A * | 6/1990 | Medard | ........................... | 411/44 |
| 5,433,100 A * | 7/1995 | Easterbrook et al. | ........ | 72/391.2 |
| 5,634,751 A | 6/1997 | Stencel et al. | | |
| 5,927,919 A * | 7/1999 | Blankenship et al. | ........ | 411/60.1 |
| 6,247,883 B1 * | 6/2001 | Monserratt | ..................... | 411/34 |
| 6,868,757 B2 * | 3/2005 | Hufnagl et al. | ................... | 81/55 |
| 7,059,816 B2 * | 6/2006 | Toosky | ......................... | 411/181 |
| 7,980,800 B2 * | 7/2011 | Kleinman et al. | .............. | 411/43 |

FOREIGN PATENT DOCUMENTS

| | | |
|---|---|---|
| DE | 1 627 429 | 11/1970 |
| EP | 0 161 916 A1 | 11/1985 |
| EP | 0 334 706 | 5/1991 |
| EP | 0 655 560 A1 | 5/1995 |
| GB | 525695 | 9/1940 |
| GB | 1 082 813 | 9/1967 |
| WO | WO 2006/108245 | 10/2006 |

OTHER PUBLICATIONS

European Search Report dated Dec. 19, 2007 issued in connection with applicant's European Patent Application No. 07 012 232.0 (now European Patent No. 1 889 688 entitled "Wedgelock and Disposable Bushing Therefor" (18 pages).

(Continued)

*Primary Examiner* — David Bryant
*Assistant Examiner* — Bayan Salone
(74) *Attorney, Agent, or Firm* — Greenberg Traurig, LLP (57) ABSTRACT

A fastening assembly, comprising a first element forming a first contact surface and a second element forming a second contact surface, which for producing a clamping force may be moved relative to one another in an axial direction is disclosed. The fastening assembly also comprises a device for performing a relative motion of the two contact surfaces with respect to one another. The second element is provided in the form of a plastically deformable sleeve which may be detachably fastened to the first element designed as a pretensioning element. The disclosure further relates to a disposable sleeve for use in such a fastening assembly, and to a method for fixing and/or clamping at least one in particular multilayer component.

11 Claims, 6 Drawing Sheets

OTHER PUBLICATIONS

European Office Action dated Sep. 22, 2008 issued in connection with applicant's related European Patent No. EP 1 889 688 (2 pages).

European Office Action dated Jan. 26, 2009 issued in connection with applicant's related European Patent No. EP 1 889 688 (9 pages).

* cited by examiner

FASTENING ASSEMBLY AND DISPOSABLE SLEEVE FOR SAME

RELATED APPLICATIONS

This application claims the benefit of and priority to German utility model application No. 20 2006 012 668.6, filed on Aug. 18, 2006, the contents of which are incorporated by reference herein in its entirety.

BACKGROUND

1. Field

The present disclosure relates to a fastening assembly, in particular for clamping bodies to be joined together, comprising a first element forming a first contact surface and a second element forming a second contact surface, which for producing a clamping force may be moved relative to one another in an axial direction, and comprising a device for performing a relative motion of the two contact surfaces with respect to one another, at least the second element in its extension in a direction at least substantially perpendicular to the axial direction being convertible from a compressed state to an expanded state for forming the second contact surface. The disclosure further relates to a disposable sleeve for use in such a fastening assembly.

2. General Background

Sandwich components formed from multiple interconnected layers are often used in lightweight construction, for example for use in aircraft. These layers may be composed of light metal, fiber composites, or the like. In the assembly of aircraft components, structural parts and plates must be joined to one another in a superposed manner. A liquid sealant which adhesively bonds the layers to one another is generally applied between these components made of aluminum or carbon fiber composite. These components of the sandwich structure are joined by first prepositioning the components. Temporary fastening assemblies which are inserted into holes in the sandwich structure are used to precisely position the components relative to one another, to compensate for any deformations, and by means of a defined pretensioning to press the components together and displace excess sealant, so that excess sealant can emerge as a result of this pressing.

Screw fasteners have been frequently used heretofore for clamping the layers during curing of the sealant. A screw fastener is usually provided with, for example, two spring arms which closely contact one another in the unstressed state and form an expandable prong, and which are provided on one end with a hook-like projection or border lip.

In a tightly compressed state the spring arms may be passed through a borehole in the sandwich structure until the hook-like projections emerge at the underside of the layered structure. A central mandrel is then guided between the spring arms, causing the spring arms to spread apart and the hook-like projections to engage behind the lowest ply of the layered structure. The spring arms may then be tightened against a suitable contact surface of a counterelement of the screw fastener, thereby exerting an axial clamping force on the sandwich structure. After the sealant has cured, the mandrel is removed, allowing the spring arms to once again be moved radially inward so that the hook-like projections may again pass through the borehole when the screw fastener is withdrawn from the sandwich structure. Usually a blind rivet is then inserted into the borehole to keep the sandwich structure compressed, even during operation.

A disadvantage of such screw fasteners is that the sealant may also flow into the borehole as a result of the clamping force applied by the screw fastener, and the spring arms and the mandrel for the screw fastener come into contact with the sealant. The screw fastener must therefore be thoroughly cleaned after each use, which sometimes entails high logistical effort. In addition, there is a risk that the curing sealant may prevent the spring arms from springing back after the mandrel is withdrawn, thus preventing removal of the screw fastener from the borehole.

SUMMARY

In contrast to the prior art, the object of the present invention is to provide a fastening assembly of the aforementioned type which may be quickly and reliably detached from the sandwich structure after the sealant has cured, and may be reused essentially immediately afterward, i.e., without a cleaning operation.

This object is achieved according to the invention essentially by providing the second element in the form of a plastically deformable sleeve which may be detachably fastened to the first element designed as a pretensioning element, and which may be tightened against the pretensioning element by means of the device for performing a relative motion in such a way that the sleeve forms, for example, an annular, radially outwardly extending bulge which defines the second contact surface. In this manner, in its undeformed state in which the sleeve has a cylindrical outer contour, for example, the sleeve may be easily inserted into a borehole in the sandwich structure. Bracing of the sleeve against the pretensioning element of the fastening assembly causes the sleeve to deform, creating an annular projection or bulge, and thus forming a contact surface. This contact surface is formed directly beneath the lowest layer of the sandwich structure, since a bulge inside the borehole is not possible. After the sealant has cured, the sleeve may be separated from the rest of the fastening assembly, and may either remain in the sandwich structure or be pressed out from same.

Since the boreholes in the sandwich structure are usually redrilled anyway before insertion of the blind rivet, it is possible to leave the sleeve in the borehole and to bore out this borehole before a blind rivet is inserted. According to the invention, the sleeve is used as a disposable part for only one clamping operation. For this reason no damage is caused by the sleeve coming into contact with the sealant, for example, during the clamping. It is not necessary to clean the sleeve since it will be discarded after one use. The fastening assembly according to the invention may therefore be put back in operation immediately after separation from the deformed sleeve by providing a new sleeve on the fastening assembly. This results in significant time savings compared to the cleaning of a screw fastener required heretofore.

On the one hand, in order to be able to apply a sufficiently high clamping force and provide a stable contact surface, and on the other hand to be quickly converted from an undeformed state having, for example, a cylindrical outer surface in the bulging state forming the outer surface, it is preferred for the sleeve to be composed of a plastically deformable metal, in particular aluminum. However, other suitable materials may be also used for producing the sleeve.

According to one preferred embodiment of the invention, the pretensioning element for the fastening assembly is formed by a housing in which the device which may be connected to the sleeve is movably guided in an axial direction for performing a relative motion.

In one refinement of this inventive concept, the device for performing a relative motion is formed by a feed rod having a first outer threaded section which is engaged with a corresponding inner threaded section of the pretensioning element, and a second outer threaded section which may be screwed into an inner threaded section of the sleeve. The feed rod allows the sleeve to be tensioned against the pretensioning element until the sleeve undergoes plastic deformation under a defined force, thus forming the second contact surface. By further tightening of the feed rod with a defined torque, a required clamping force may be applied for clamping the bodies to be adhesively bonded. It is possible to screw the sleeve onto the feed rod quickly, thus allowing the sleeve to be easily and rapidly joined to and detached from the pretensioning element for the fastening assembly.

Alternatively, the sleeve may be tensioned against the pretensioning element of the fastening assembly in other suitable ways until on the one hand the bulge for producing the second contact surface is formed, and on the other hand a suitable clamping force is applied.

When the inner diameter of the sleeve in sections at least substantially corresponds to the outer diameter of the feed rod, the direction of deformation of the sleeve is essentially specified such that an annular projection or bulge which defines the second contact surface is formed on the sleeve. Buckling of the sleeve is avoided by means of the feed rod which runs through the interior of the sleeve.

According to one preferred embodiment of the invention, the pretensioning element has a housing from which a nut body which is rotatably supported in the housing projects outward, at least in places, for contacting a tool, and a feed rod in the form of a device for performing a relative motion is engaged with the nut body, and in the housing a clamping sleeve not engaged with the feed rod is provided which forms, for example, an annular support surface against which the sleeve rests during operation. In this design an end face of the housing may form the first contact surface, whereas the sleeve which forms the second contact surface after the deformation is supported against the clamping sleeve. The clamping sleeve and the housing may be designed in such a way that sealant which emerges from the sandwich structure during the clamping is not able to penetrate into the housing of the pretensioning element. Therefore, it is not necessary to clean the movable parts of the fastening assembly after each use.

During curing of the sealant, settling or other reduction in thickness of the sandwich structure may occur in particular due to exit of the sealant. To nevertheless allow the necessary clamping force to be applied during curing, an elastic element, a disk spring set, for example, is preferably situated in the pretensioning element in such a way that in its compressed state the elastic element exerts a clamping force for impingement on the two contact surfaces. The disk spring set is preferably situated between the housing for the pretensioning element and the clamping sleeve. As a result, the disk spring set may exert a high clamping force even when the sandwich structure to be clamped undergoes settling on account of the emerging sealant.

To simplify removal of the sleeve from the rest of the fastening assembly, a ratchet having an associated locking element may be provided in the pretensioning element.

At least one in particular radially extending groove is preferably provided in the region of the pretensioning element, i.e., the end face of the housing, for example. which forms the first contact surface. By use of this groove, sealant emerging during the clamping may be conducted outward, thus further minimizing the risk of sealant penetrating into the fastening assembly.

In order to first achieve a defined design of the second contact surface by means of, for example, a bead-like deformation of the sleeve before the sandwich structure or similar component is clamped, the pretensioning element is preferably provided with a pressure piece for contacting the sleeve and which cooperates with a feed rod in such a way that for deforming the sleeve, the pressure piece is held at least substantially stationary in the pretensioning element during a first phase of a displacement motion of the feed rod, and during a second phase of the displacement motion of the feed rod for clamping the components to be connected the pressure piece together with the feed rod is moved relative to the housing of the pretensioning element. In other words, in the first phase of the motion of the feed rod only the sleeve is pulled against the pressure piece without a clamping force being exerted on the, for example, sandwich-like component, thus allowing the bulge to be formed on the sleeve first. The sleeve is not retracted into the pretensioning element together with the pressure piece until the subsequent second phase of motion of the feed rod, so that a clamping force is exerted at that time.

In one refinement of this inventive concept, the pressure piece is displaceably supported in a guide section of the housing which has a radial, groove-like recess, and the feed rod has at least two sections of differing diameters, the diameter of the front section facing the sleeve being smaller than that of the rear section facing away from the sleeve, and at least one sphere being accommodated adjacent to the pressure piece and between the guide section and the feed rod such that axial motion of the pressure piece is blocked as long as the at least one sphere is accommodated between the recess and the rear section of the feed rod, and an axial motion of the pressure piece is permitted as long as the at least one sphere is accommodated outside the recess between the guide section and the front section of the feed rod. The pressure piece may thus be locked by the spheres in the manner of a quick release pin in order to initially form the deformation on the sleeve, and then to release it from the lock in order to be pulled together with the feed rod into the housing of the pretensioning element.

The object of the invention is further achieved by a disposable sleeve for use in a fastening assembly of the type described above, the disposable sleeve being composed of a material, preferably aluminum, which is plastically deformable by bulging under a defined axial stress, and having an inner surface provided in places with an inner thread and having an end face, provided on the side facing away from the inner thread, which serves as a stop surface against an element of the fastening assembly. The disposable sleeve according to the invention may be separated from the sandwich structure, for example by boring or pressing after the sealant has cured. The use of an economically producible disposable sleeve which may be quickly joined to and detached from the rest of the fastening assembly allows the clamping of layers of a sandwich structure to be significantly simplified and accelerated, since a laborious cleaning operation of the fastening assembly is not necessary. In particular for the manufacture of aircraft components, in which a very large number of temporary fastening assemblies are used, this results in a significant time savings and a marked improvement in the logistical effort. Furthermore, disposable sleeves of different lengths or thicknesses may be kept on hand in order to use the disposable sleeves with the same pretensioning element for the fastening assembly, depending on the conditions of use.

According to one preferred embodiment of the invention, the outer surface of the disposable sleeve is provided, at least in places, with channels or projections running in an axial direction. Twisting of the sleeve in a borehole may thus be impeded, thus facilitating detachment of the (disposable) sleeve from the feed rod or similar element for the fastening assembly.

To produce the bulge which forms the second contact surface by means of a defined axial force, a region is preferably provided for introducing the bulge on the disposable sleeve. This region is advantageously adjacent to the inner threaded section of the disposable sleeve. The region for introducing the bulge may be achieved, for example, by a defined weakening or a slight prebuckling of the disposable sleeve.

The weakened region may be formed, for example, by a tapering of the wall thickness of the sleeve. It has proven to be particularly advantageous when, for example, a bulging, groove-like indentation is provided on the inner side of the sleeve which provides the tapering of the wall thickness of the sleeve. This region may be deformed more easily in a defined manner than the rest of the sleeve. Alternatively or additionally, the deformability of a region of the sleeve may be enhanced by heat treatment, in particular by inductive heating.

The sleeve may be manufactured in a particularly simple and economical manner when the sleeve has a one-piece design. According to a further embodiment of the invention, the sleeve has a multipart, in particular two-part, design, and has a tubular section facing the pretensioning element and a threaded section facing away from the pretensioning element, the threaded section being provided with a thread which may be twisted by the pretensioning tool. The multipart design of the sleeve allows individual regions of the sleeve to be shaped according to the intended purpose. Thus, for example, the tubular section may be made of a more rigid material than the threaded section on which the bead-like deformation is to be provided.

In one refinement of this inventive concept, the tubular section and the threaded section fit one inside the other in an overlapping manner in a connecting region, the tubular section and/or the threaded section having a conical or beveled transition region such that the tubular section or the threaded section radially expand with respect to one another during an axial relative motion. In other words, during the clamping process the threaded sleeve is, for example, pressed into the tubular section, causing the tubular section to expand in a defined manner in a connecting region having, for example, a reduced diameter. This expansion causes the sleeve to be clamped in the radial direction in the borehole of the workpiece, thus allowing rotation of the sleeve in the borehole to be prevented when the tool is removed. In the connecting region the threaded section may have a conical collar, and the tubular section may have a circumferential groove which is adapted to the conical collar in such a way that the latter may be flanged radially inwardly into the groove.

To prevent contaminants from penetrating into the threaded section, according to one preferred embodiment the threaded section is closed off by a cap on the side facing away from the tubular section.

The invention further relates to a method for fixing and/or clamping at least one in particular multilayer component, comprising the following steps: First a deformable sleeve and a feed rod of a pretensioning element detachably connected thereto are inserted through an opening in the at least one component until at least one region of the sleeve on the side facing away from the pretensioning element emerges from the at least one component. An axial motion of the feed rod relative to the pretensioning element is then performed in a direction which tensions the sleeve with respect to the pretensioning element, producing, for example, a bead-like deformation in a section of the sleeve, the bead-like deformation engaging behind the at least one component on the side thereof facing away from the pretensioning element. In addition, for clamping the component the axial motion of the feed rod relative to the pretensioning element may be continued after the deformation in the sleeve is provided, so that the at least one component is clamped between a contact surface of the pretensioning element and the deformation which forms a second contact surface.

Refinements, advantages, and application possibilities of the invention result from the following description of exemplary embodiments and the drawing. All described and/or graphically illustrated features constitute the subject matter of the invention, as such or in any given combination, irrespective of their summary in the claims or back references thereof.

DRAWINGS

The figures show the following:

FIG. 9b shows an enlarged illustration of a detail from FIG. 9a;

FIG. 10b shows an enlarged illustration of a detail from FIG. 10a.

DETAILED DESCRIPTION

Figure 1:
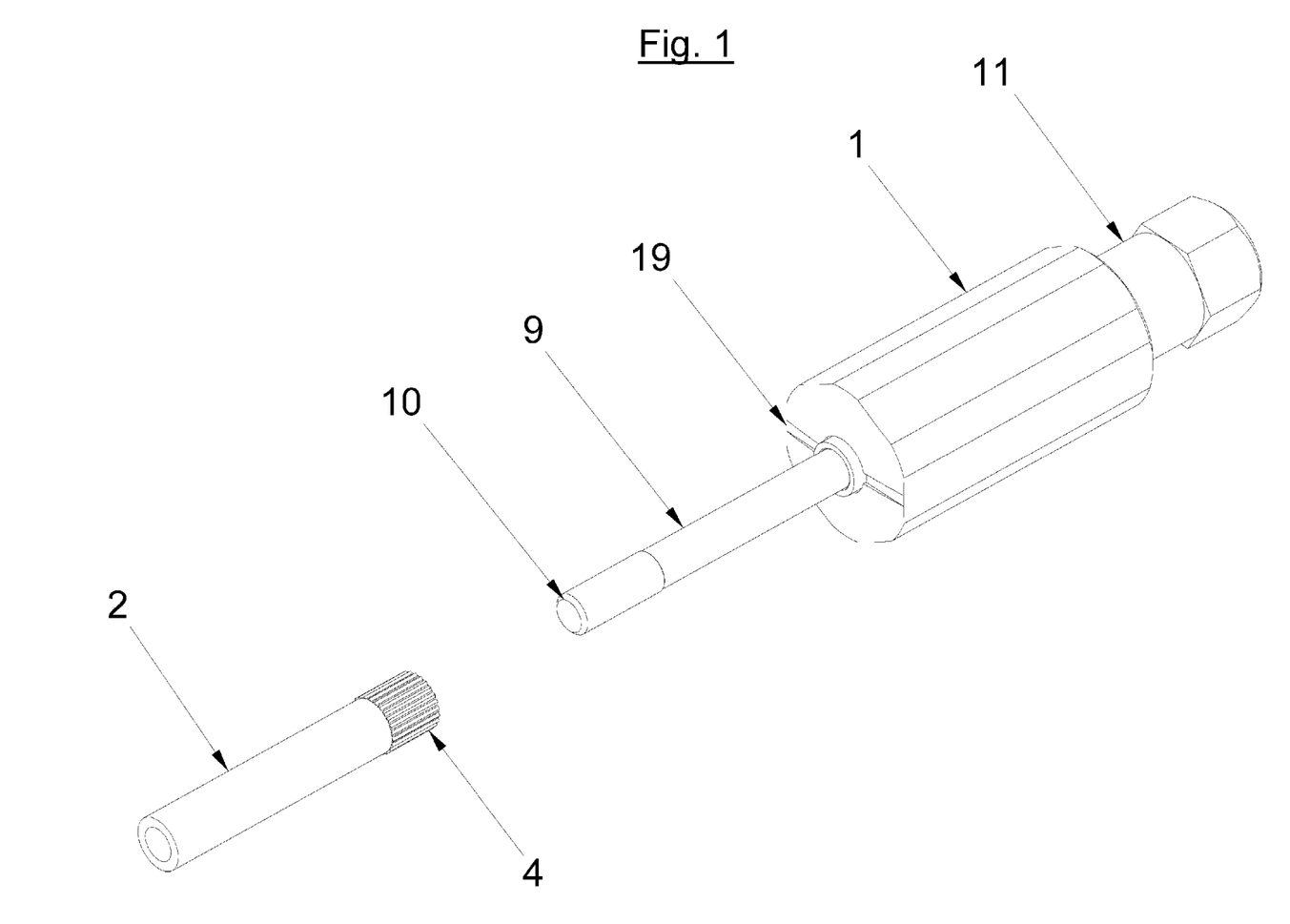
FIG. 1 shows a perspective view of a fastening assembly according to the invention, together with a pretensioning element and a disposable sleeve.
Figure 2:
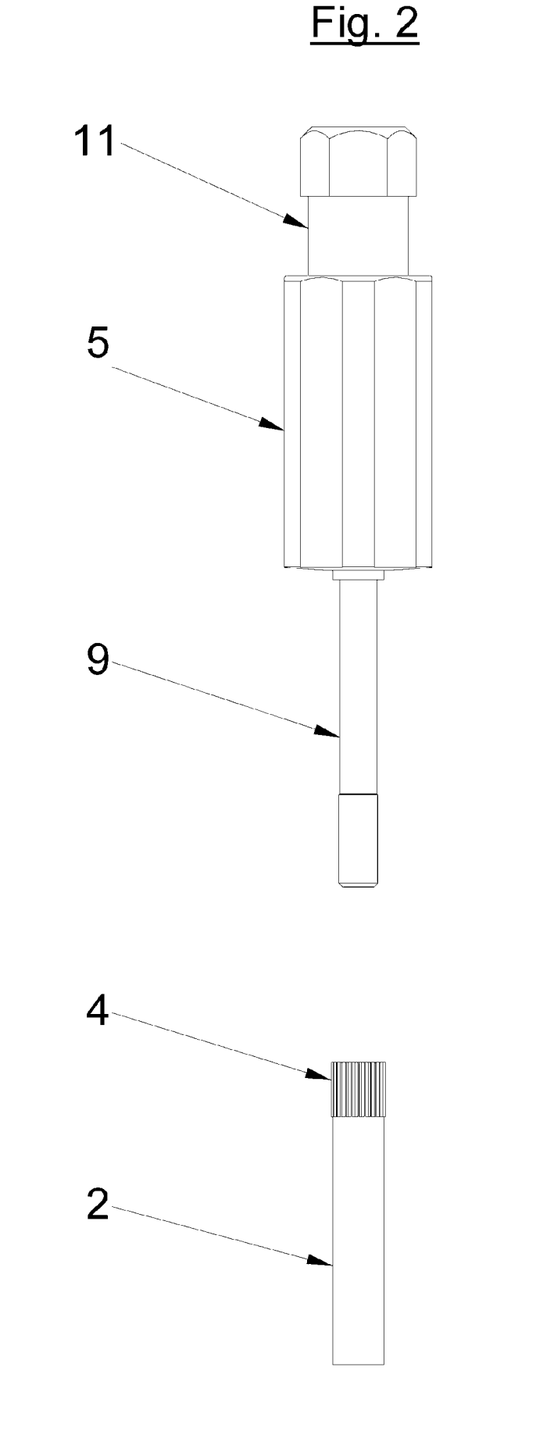
FIG. 2 shows a side view of the pretensioning element for the fastening assembly according to FIG. 1.

The fastening assembly illustrated in FIGS. 1 through 5 comprises a pretensioning element 1, and a sleeve 2 which may be detachably fastened to the pretensioning element 1. For this purpose the sleeve 2 is provided with an inner threaded section, illustrated in FIG. 5. This inner threaded section 3 extends in the lower region of the sleeve, shown in FIGS. 2 and 5, whereas the remaining region of the inner surface of the sleeve 2 is not provided with a thread. As shown in FIGS. 1 and 2, the outer surface of the sleeve 2 has an essentially smooth, cylindrical design. However, an upper region of the sleeve 2 shown in FIG. 2 may be provided with profiling, which in the illustrated embodiment is formed by channels 4 running in an axial direction of the sleeve 2.

Figure 3:
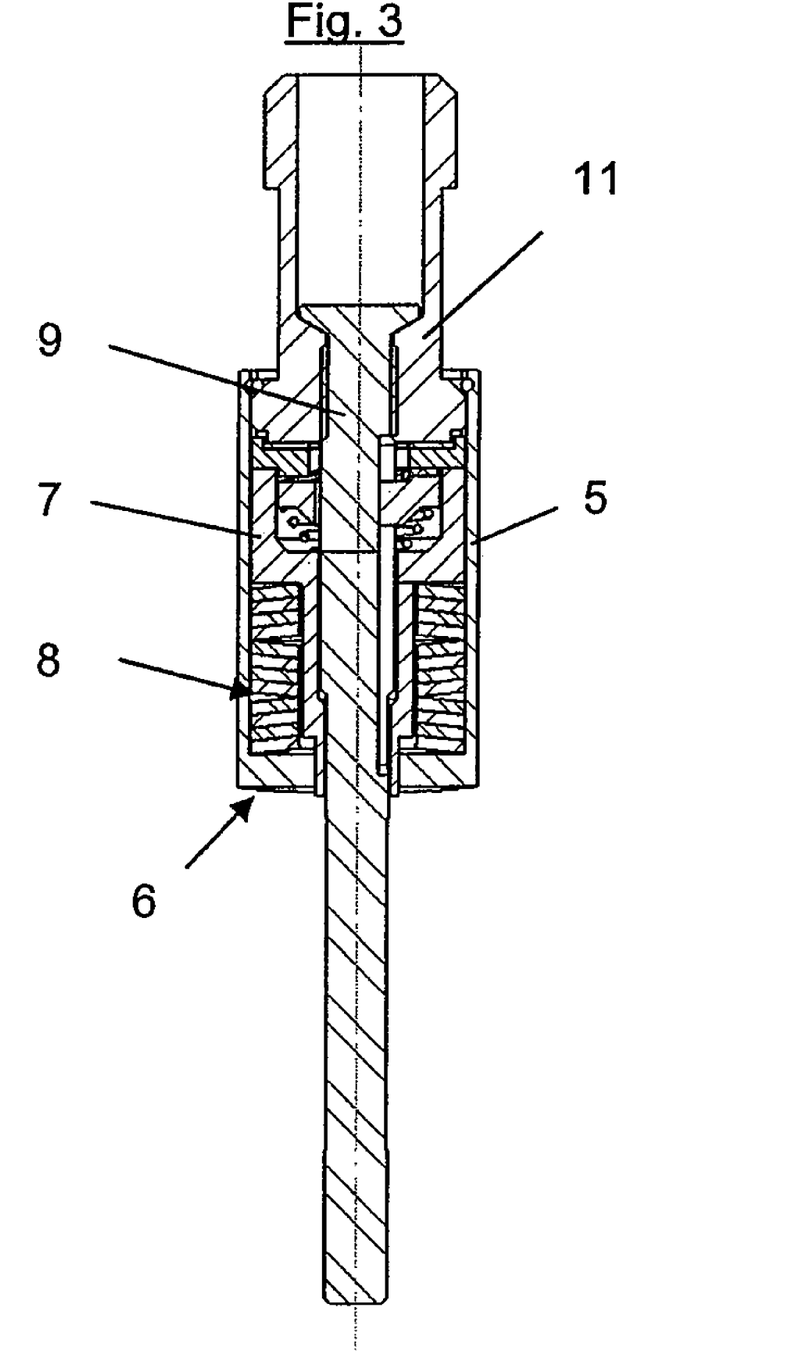
FIG. 3 shows a sectional view of the pretensioning element according to FIG. 2.
Figure 5:
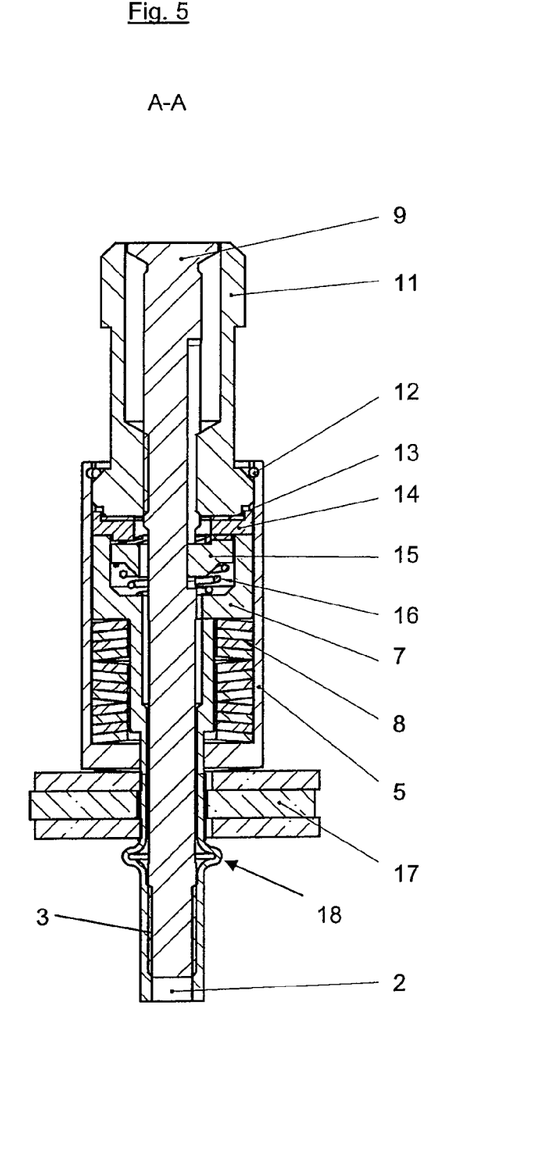
FIG. 5 shows a sectional view of the fastening assembly according to FIG. 4.

The structure of the pretensioning element 1 is shown most clearly in the sectional view of FIGS. 3 and 5. The pretensioning element 3 [sic; 1] has a cup-shaped housing 5, the lower end face of which shown in FIG. 3 forms a first contact surface 6. A tube-like projection of a clamping sleeve 7 accommodated in the housing 5 is guided through an opening in the contact surface 6. In its lower region shown in FIGS. 3 and 5, the clamping sleeve 7 does not extend over the entire width of the housing 5, thus allowing a disk spring set 8 to be accommodated in the annular cavity formed between the inner wall of the housing 5 and the outer surface of the clamping sleeve 7. The disk spring set 8, which is supported on the lower end face of the housing 5 and a shoulder of the clamping sleeve 7, pushes the clamping sleeve 7 upward as viewed in the figures.

A feed rod 9 is guided in a rotatable and axially displaceable manner through the clamping sleeve 7, and on its front end projecting from the housing 5 the feed rod has an outer threaded section 10. The front end of the feed rod 9 is designed such that the sleeve 2 may be easily mounted on the feed rod 9, and the outer threaded section 10 may be screwed into the inner threaded section 3 of the sleeve 2. If necessary, minimum play remains between the inner wall of the sleeve 2 and the outer wall of the feed rod 9.

Via an outer threaded section shown in the upper part of FIGS. 3 and 5 the feed rod 9 is engaged with a nut body 11 having an inner threaded section. The nut body 11 is accommodated in the housing 5 and is rotatable relative thereto. For contacting a tool, the nut body 11 is provided in places with external profiling. Rotation of the nut body 11 relative to the housing 5 causes the feed rod 9 to move in an axial direction inside the housing 5 between an extended position of the feed rod 9, shown in FIG. 3, and a retracted position of the feed rod 9, shown in FIG. 5. A snap ring 12 prevents the nut body 11 from being unintentionally removed from the housing 5.

In the housing 5 a ratchet system is provided between the nut body 11 and the clamping sleeve 7. The ratchet system is formed by a washer disk 13, a locking element 14, and a ratchet 15 having an associated conical spring 16. The washer disk 13 reduces the frictional resistance between the rotatable nut body 11 and the stationary locking element 14. The conical spring 16, which has a particularly space-saving design in the compressed state and which is supported in a recess in the clamping sleeve 7, presses the ratchet 15 against the locking element 14, thus preventing clockwise rotation of the ratchet and therefore also of the feed rod 9 connected to the ratchet. In the opposite, counterclockwise rotational direction the ratchet 15 when pressed against the locking element 14 by the conical spring 16 likewise prevents rotation of the feed rod 9. When a defined torque is reached, for example when the feed rod 9, as shown in FIG. 3, rests against a stop for the nut body 11, the ratchet 15 may be pushed downward against the force of the conical spring 16, performing a relative motion with respect to the locking element 14 and causing the feed rod 9 to rotate along with the nut body 11 during rotation thereof. This is necessary to allow the feed rod 9 to be screwed from the sleeve 2.

Figure 4:
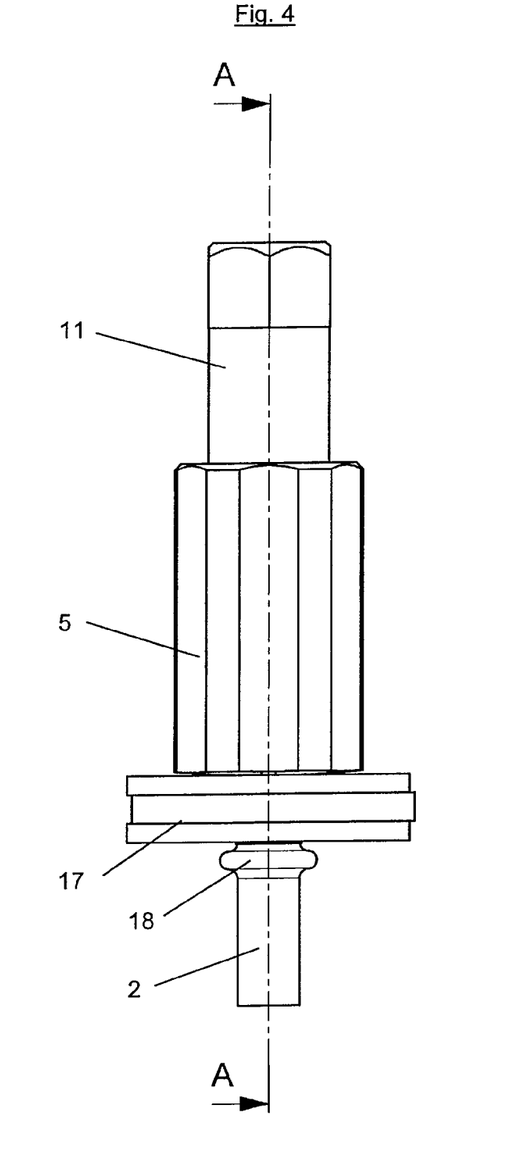
FIG. 4 shows a side view of a fastening assembly according to the invention corresponding to FIG. 1 during clamping of a sandwich structure.

The operation of the fastening assembly is described in greater detail below. During the assembly of aircraft components, structural parts and plates are joined to one another in a superposed manner. These components may be made of aluminum or carbon fiber composites, for example. Such a sandwich structure 17 is illustrated in FIGS. 4 and 5. To join the individual layers of the sandwich structure 17 a generally liquid sealant is applied between the layers, and the individual layers are prepositioned relative to one another.

A fastening assembly having a pretensioning element 1 and a sleeve 2 screwed thereto is inserted through predrilled holes in the sandwich structure 17. In FIG. 3 the feed rod 9 for the pretensioning element 1 is shown in the extended position, in which the feed rod extends far from the housing 5. With its upper end face as viewed in the figures, the sleeve 2 pushes against the lower end face of the clamping sleeve 7 as viewed in the figures, and is pressed against same in a sealing manner. The length of the sleeve 2 is such that the inner threaded section 3 as well as a section of the sleeve 2 not provided with an inner thread project downward from the sandwich structure 17.

If the nut body 11 is then rotated clockwise relative to the housing 5, the feed rod 9 is retracted into the housing 5 until it reaches the position shown in FIG. 5. This also causes the sleeve 2 to be pushed farther against the clamping sleeve 7 for the pretensioning element 1. The sleeve 2, made of aluminum, for example, is designed in such a way that the sleeve 2 bulges radially outward under a given axial force. As a result of this bulge produced on the underside of the sandwich structure 17, shown in FIGS. 4 and 5, a second contact surface 18 is formed which rests against the underside of the sandwich structure 17. In this manner the sandwich structure 17 is clamped between the first contact surface 6 defined by the housing 5 and the second contact surface 18 formed by the sleeve 2. The disk spring set 8 is also compressed.

As a result of pressing together the sandwich structure 17, the sealant which is still liquid, for example, may be partially pressed out. For this purpose, as illustrated in FIG. 1, radially extending grooves 19 are provided in the first contact surface 6 of the pretensioning element 1 which act as channels for draining off the emerging sealant. Since the upper end face of the sleeve 2 is firmly pressed in a sealing manner against the lower end face of the clamping sleeve 7, the sealant does not penetrate into the housing 5. The movable components therefore do not come into contact with the sealant. Any decrease in thickness of the sandwich structure 17 during pressing as the result of emerging sealant or the like may be compensated for by the disk spring set 8, so that an essentially constant clamping force is exerted on the sandwich structure 17.

After the sealant has cured, the feed rod 9 is screwed out from the sleeve 2 and the pretensioning element 1 may be removed from the sandwich structure 17, whereas the sleeve 2 remains in the sandwich structure 17. The holes in the sandwich structure 17 are redrilled before further processing, for example by insertion of a blind rivet. The sleeve 2 may be bored out. Since the movable parts of the pretensioning element 1 have not come into contact with the curing sealant, the pretensioning element 1 may be reused immediately after a new (disposable) sleeve 2 is mounted.

Figure 6:
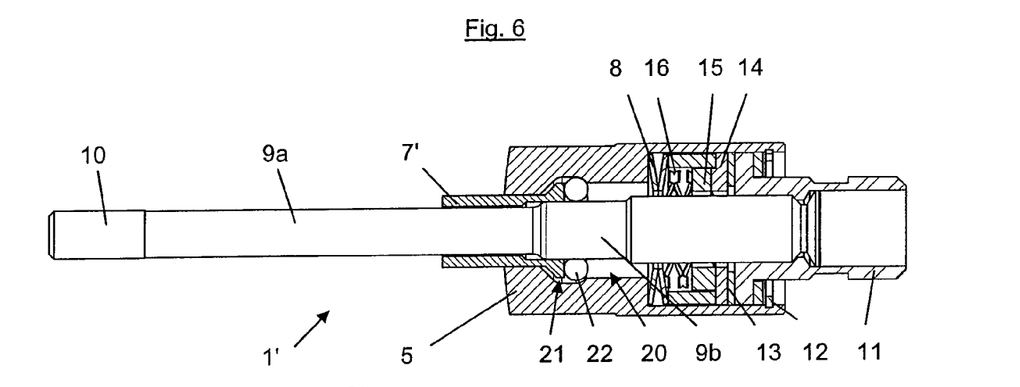
FIG. 6 shows a sectional view of a pretensioning element according to a second embodiment of the invention.
Figure 7A:
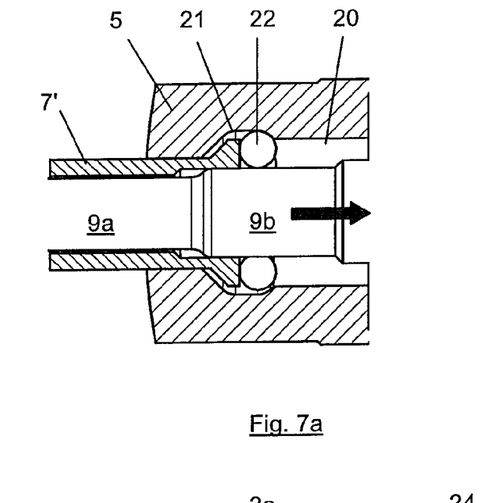
FIGS. 7a, 7b show an enlarged illustration of a detail from FIG. 6 in a first and a second phase of the motion of the feed rod.
Figure 7B:
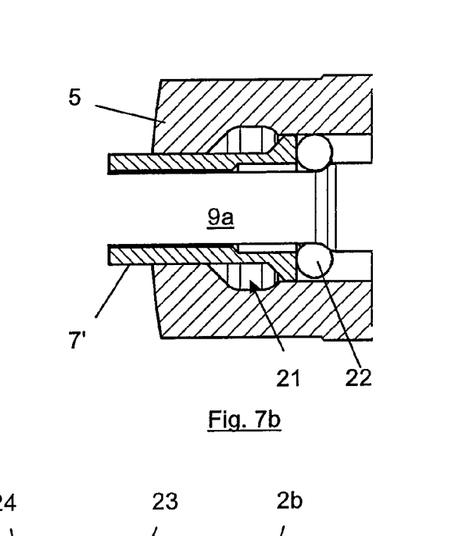

A second embodiment of a pretensioning element according to the invention is illustrated in FIGS. 6, 7a, and 7b. The pretensioning element 1' essentially has the structure described above with reference to FIGS. 1 through 5. However, in contrast to the clamping sleeve 7 in the first embodiment, the pretensioning element 1' has a modified pressure piece 7' which is displaceably supported in a guide section 20 of the housing 5 for the pretensioning element 1'. As shown in FIGS. 7a and 7b, the pressure piece 7' may thus be pushed essentially from the position projecting from the pretensioning element 1' (FIG. 7a) into the position retracted into the pretensioning element 1' (FIG. 7b). The feed rod 9 for the pretensioning element 1 has a front section 9a facing the sleeve 2 and a rear section 9b facing away from the sleeve 2, the outer diameter of the rear section 9b being greater than that of the front section 9a. A groove-like recess 21 is also provided in the guide section 20 of the housing 5, thereby enlarging the inner diameter of the housing 5 in the vicinity of the recess 21. The difference in diameters between the guide section 20 and the recess 21 corresponds at least approximately to the difference in diameters between the two sections 9a and 9b of the feed rod 9.

In the illustrated embodiment, in the pretensioning element 1' between the feed rod 9 and the guide section 20 multiple spheres 22 are accommodated, the diameters of which correspond approximately to the distance between the feed rod 9 and the guide section 20. As shown in FIG. 7a, the spheres 22 are pushed into the cutout 21, i.e., radially outwardly, as long as the larger section 9b of the feed rod 9 is located in the vicinity of the guide section 20, thereby blocking axial motion of the pressure piece 7'. On the other hand, the spheres 22 fall radially inward when section 9a having the smaller diameter is located in the vicinity of the guide section 20. The spheres together with the pressure piece 7' may thus be pushed into the housing 5 of the pretensioning element 1 when the feed rod 9 is retracted farther.

In this manner it is possible, starting in the position of the clamping sleeve 7' locked by the spheres 22, to form the bead-like deformation on the sleeve without the component to be clamped undergoing appreciable tensioning. On the other hand, if the feed rod 9 is retracted farther in the direction indicated by the arrow in FIG. 7a, i.e., into the housing 5 of the pretensioning element 1', the spheres 22 fall inward and for tensioning the component may be retracted together with the pressure piece 7' and the feed rod 9.

Figure 8:
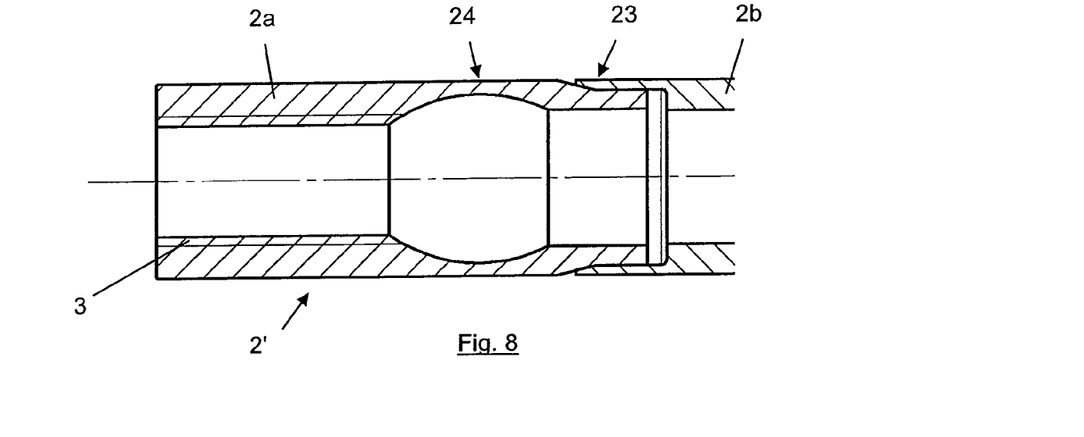
FIG. 8 shows a sectional view of a disposable sleeve according to a second embodiment of the invention.

A further embodiment of a sleeve 2' is illustrated in FIG. 8. The sleeve 2' has a two-part design, and has a threaded sleeve 2a and a tubular section 2b which are fitted one inside the other in a connecting region 23. The tubular section 2b is pushed at a region of comparatively low wall thickness over a region of the threaded section 2a. In the illustrated embodiment, in the connecting region 23 both the threaded sleeve 2a and the tubular section 2b are provided with a beveled transition region, thereby expanding the thin-walled region of the tubular section 2b radially outward when the threaded sleeve 2a is retracted into the tubular section 2b. In this manner the tubular section 2b may be clamped in a borehole of a component.

FIG. 8 also illustrates a weakened region 24 of the sleeve 2' which is formed by an inner recess, thereby tapering the wall thickness of the threaded sleeve 2a in places. This weakened region 24 is used for defined introduction of the deformation in the sleeve 2'.

Figure 9A:
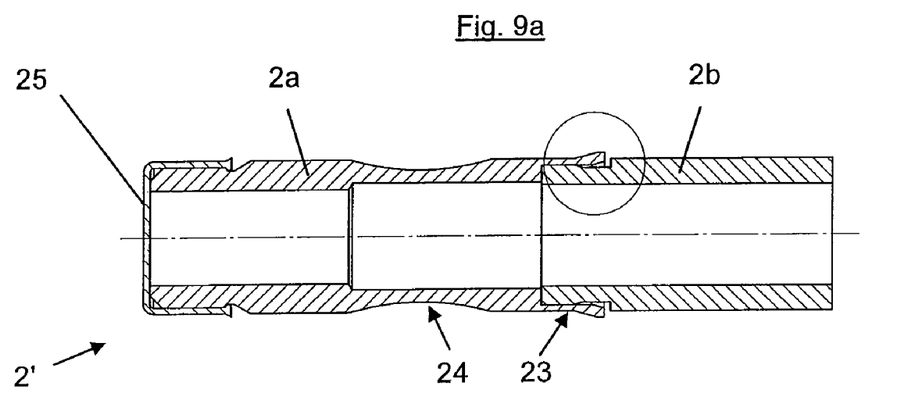
FIG. 9a shows a sectional view of a disposable sleeve according to a third embodiment of the invention, before connection of the sleeve sections.
Figure 9B:
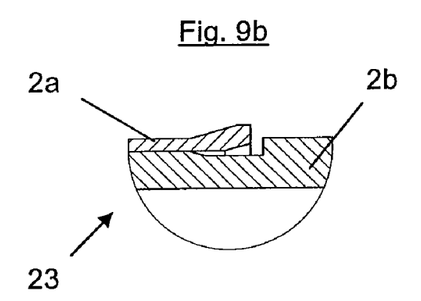
Figure 10A:
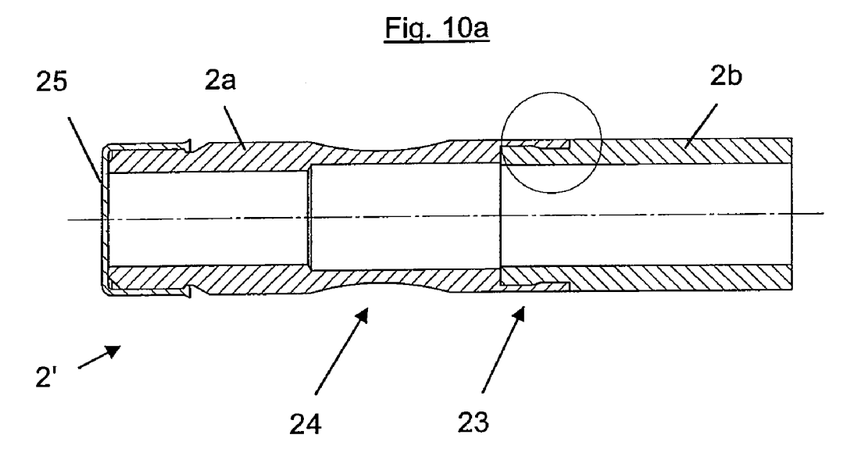
FIG. 10a shows a sectional view of a disposable sleeve according to FIG. 9a, after connection of the sleeve sections.
Figure 10B:
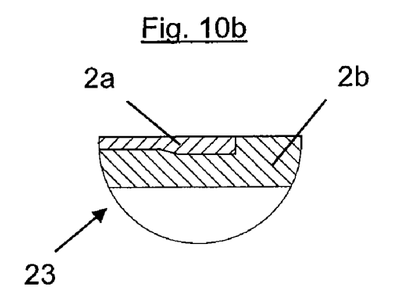

FIGS. 9a through 10b illustrate a further embodiment of a two-part sleeve 2'. The threaded section 2a is provided with a conical collar in the connecting region 23, and the tubular section 2b is provided with a circumferential groove which is adapted to the conical collar in such a way that the latter may be flanged radially inwardly into the groove. FIGS. 9a and 9b show the threaded section 2a and the tubular section 2b before the collar is flanged, whereas FIGS. 10a and 10b illustrate the threaded section 2a and the tubular section 2b connected together. In a manner similar to that described above with reference to FIG. 8, the connecting region 23 is designed such that the thin-walled region of the threaded section 2a is expanded radially outward when the tubular section 2b is retracted into the threaded sleeve 2a in order to clamp the threaded sleeve 2a in the borehole of a component.

In addition, the threaded section 2a is closed off by a cap 25 on the side facing away from the tubular section 2b. The cap prevents contaminants from penetrating into the threaded section 2a, and is able to eject any contaminants when the sleeve 2' is inserted into the borehole. Furthermore, the cap may be used, for example, as a colored indicator for the total length of the sleeve 2'.

The invention claimed is:

1. A fastening assembly, for clamping bodies, in particular layered bodies, together, comprising:
   a pretensioning element having an inner threaded section and forming a first contact surface, wherein the first contact surface is positioned against a first side of the clamping bodies;
   a plastically deformable disposable sleeve having an inner threaded section and forming a second contact surface, wherein, for producing a clamping force, the pretensioning element and the plastically deformable disposable sleeve are moved relative to one another within, at least partially, a hole through the clamping bodies; and
   a device for performing a relative motion of the two contact surfaces with respect to one another, the device for performing a relative motion including a feed rod having a first outer threaded section, which is engaged with the inner threaded section of the pretensioning element, and a second outer threaded section, which is screwed into the inner threaded section of the plastically deformable disposable sleeve,
   wherein the plastically deformable disposable sleeve is operationally detachably fastened to the pretensioning element, and which is operationally tightened against the pretensioning element by the device for performing a relative motion in such a way that the plastically deformable disposable sleeve deforms, at a distance away from a second side of the clamping bodies, to form the second contact surface,
   wherein the second contact surface is positioned against the second side of the clamping bodies,
   wherein at least a portion of the plastically deformable disposable sleeve is positioned within the hole through the clamping bodies, and
   wherein the pretensioning element, the plastically deformable disposable sleeve, and the device for performing a relative motion are removed from the clamping bodies prior to installing a fastener into the hole.

2. The fastening assembly according to claim 1, wherein the pretensioning element is formed by a housing in which the device for performing a relative motion is movably guided in an axial direction.

3. The fastening assembly according to claim 1 wherein an inner diameter of the plastically deformable disposable sleeve, in sections, at least substantially corresponds to an outer diameter of the feed rod.

4. The fastening assembly according to claim 1 wherein the pretensioning element has a housing from which a nut body which is rotatably supported in the housing projects outward, at least in places, for contacting a tool, and the feed rod is engaged with the nut body, and in the housing a clamping sleeve not engaged with the feed rod is provided which forms a support surface against which the plastically deformable disposable sleeve rests during operation.

5. The fastening assembly according to claim 1 wherein an elastic element is situated in the pretensioning element in such a way that in its compressed state the elastic element exerts a clamping force for impingement on the two contact surfaces.

6. The fastening assembly according to claim 1 wherein a ratchet having an associated locking element is provided in the pretensioning element.

7. The fastening assembly according to claim 1 wherein at least one in particular radially extending groove is provided in the region of the pretensioning element which forms the first contact surface.

8. The fastening assembly according to claim 1 wherein the pretensioning element is provided with a pressure piece for contacting the plastically deformable disposable sleeve and which cooperates with the feed rod in such a way that for deforming the plastically deformable disposable sleeve, the pressure piece is held at least substantially stationary in the pretensioning element during a first phase of a displacement motion of the feed rod, and, during a second phase of the displacement motion of the feed rod for clamping the bodies to be connected, the pressure piece, together with the feed rod, is moved relative to the housing of the pretensioning element.

9. The fastening assembly according to claim 8 wherein the pressure piece is displaceably supported in a guide section of the housing which has a radial, groove-like recess, and the feed rod has at least two sections of differing diameters, the diameter of the front section facing the plastically deformable disposable sleeve being smaller than that of the rear section facing away from the plastically deformable disposable sleeve, and at least one sphere being accommodated adjacent to the pressure piece and between the guide section and the feed rod such that axial motion of the pressure piece is blocked when the at least one sphere is accommodated between the recess and the rear section of the feed rod, and an axial motion of the pressure piece is permitted when the at least one sphere is accommodated outside the recess between the guide section and the front section of the feed rod.

10. A method for clamping at least one in particular multilayer component comprising the following steps:

inserting of a deformable disposable sleeve and a feed rod of a pretensioning element detachably connected thereto through a hole in the at least one component until at least one region of the sleeve on the side facing away from the pretensioning element emerges from the at least one component, the deformable disposable sleeve having a multipart design comprising a tubular section and a threaded section which fit one inside the other in an overlapping manner in a connecting region, the threaded section having a conical collar in the connecting region, and the tubular section having a circumferential groove which is adapted to engage the conical collar in such a way that the conical collar is flanged radially inwardly into the groove during insertion of the deformable disposable sleeve through the hole in the at least one component; and performing an axial motion of the feed rod relative to the pretensioning element in a direction which tensions the sleeve with respect to the pretensioning element to produce a deformation in a section of the sleeve, wherein the deformation is formed, at a distance, behind the at least one component on the side thereof facing away from the pretensioning element; and removing the deformable disposable sleeve and the pretensioning element from the hole prior to installing a fastener into the hole.

11. The method according to claim 10 wherein the axial motion of the feed rod relative to the pretensioning element is continued after the deformation in the deformable disposable sleeve is provided, so that the at least one component is clamped between a contact surface of the pretensioning element and the deformation.

* * * * *